United States Patent [19]
Loulourgas

[11] Patent Number: 6,012,914
[45] Date of Patent: Jan. 11, 2000

[54] MULTI-COLOR INJECTION MOLD ROTATION APPARATUS

[76] Inventor: Demetre Loulourgas, 1540 Gulf Blvd., Penthouse 7, Ultimar 2, Clearwater, Fla. 34630

[21] Appl. No.: 09/076,458

[22] Filed: May 12, 1998

[51] Int. Cl.[7] .................................................. B29C 45/16
[52] U.S. Cl. ............................................. 425/574; 425/576
[58] Field of Search ...................................... 425/574, 575, 425/576, 130

[56] References Cited

U.S. PATENT DOCUMENTS

| | | |
|---|---|---|
| 1,960,187 | 5/1934 | Page . |
| 3,915,608 | 10/1975 | Hujik . |
| 4,243,362 | 1/1981 | Rees et al. . |
| 4,345,965 | 8/1982 | Lindenmayer et al. . |
| 4,424,015 | 1/1984 | Black et al. . |
| 4,726,757 | 2/1988 | Berry . |
| 4,750,875 | 6/1988 | Shiina . |
| 5,221,538 | 6/1993 | Gasami et al. . |
| 5,435,715 | 7/1995 | Campbell . |

*Primary Examiner*—Tim Heitbrink
*Attorney, Agent, or Firm*—Larson & Larson, P.A.; James E. Larson

[57] ABSTRACT

A rotatable platen for supporting a plastic molding device includes a bottom clamp plate enclosing a central pillar supporting an axially rotating gear. The rotating gear turns a vertical shaft attached to a top of the gear. A longitudinal slot in the clamp plate receives a rack assembly that engages the rotating gear and is driven by a hydraulic piston. The vertical shaft passes through a wear plate, a lower rotating plate, a thrust bearing, an intermediate housing enclosing a portion of the thrust bearing and the top of the shaft turns an upper rotating plate that engages the molding device.

20 Claims, 11 Drawing Sheets

*Fig. 19*

MULTI-COLOR INJECTION MOLD ROTATION APPARATUS

BACKGROUND OF THE INVENTION

This invention relates to support platens for molds employed in injection molding of plastic parts. More particularly, it refers to a platen for supporting and turning a mold employed for making multi-colored plastic parts.

Prior art platens employed to support plastic molds are frequently unable to support plastic molds because of weight problems or are too slow in turning the mold for acceptance of different injections of plastic molding material. In addition, they wear out early and require frequent replacement because of internal wear of parts.

A typical prior art turntable for rotation relative to a base is shown in U.S. Pat. No. 3,915,608. Other movable mold platens are shown in U.S. Pat. Nos. 4,243,362; 4,424,015; 4,726,757; 4,750,875; 5,221,538 and 5,435,715. None of these patents describe a platen which possesses the features of applicant's mold rotation apparatus permitting multi-color molding of plastic objects in molds of large mass without frequent breakdown.

SUMMARY OF THE INVENTION

The invention described herein is a rotatable support platen, for sustaining the weight of large molds used in making plastic objects of two or more colors, with the ability to rapidly turn the mold up to 180° for injection of plastic from different nozzles containing different colored plastic.

The inventive rotatable support platen has a bottom clamp plate enclosing a central pillar supporting an axially rotating gear. A longitudinal slot in the bottom clamp plate receives a rack assembly powered by a hydraulic piston, such rack assembly having gear teeth that turn the axially rotating gear. The rotating gear turns a vertical shaft attached to the top of the gear. The shaft passes through a wear plate, a lower rotating plate, a thrust bearing and an upper rotating plate supporting a mold. The thrust bearing is mounted over the lower rotating plate and is at least partially enclosed by the intermediate housing. An upper rotating plate is supported by the intermediate housing. It receives the top portion of the vertical shaft. Appendages project from the upper rotating plate to engage and hold molds placed on the platen.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Throughout the following detailed description the same reference numerals refer to the same elements in all the figures.

Figure 4:
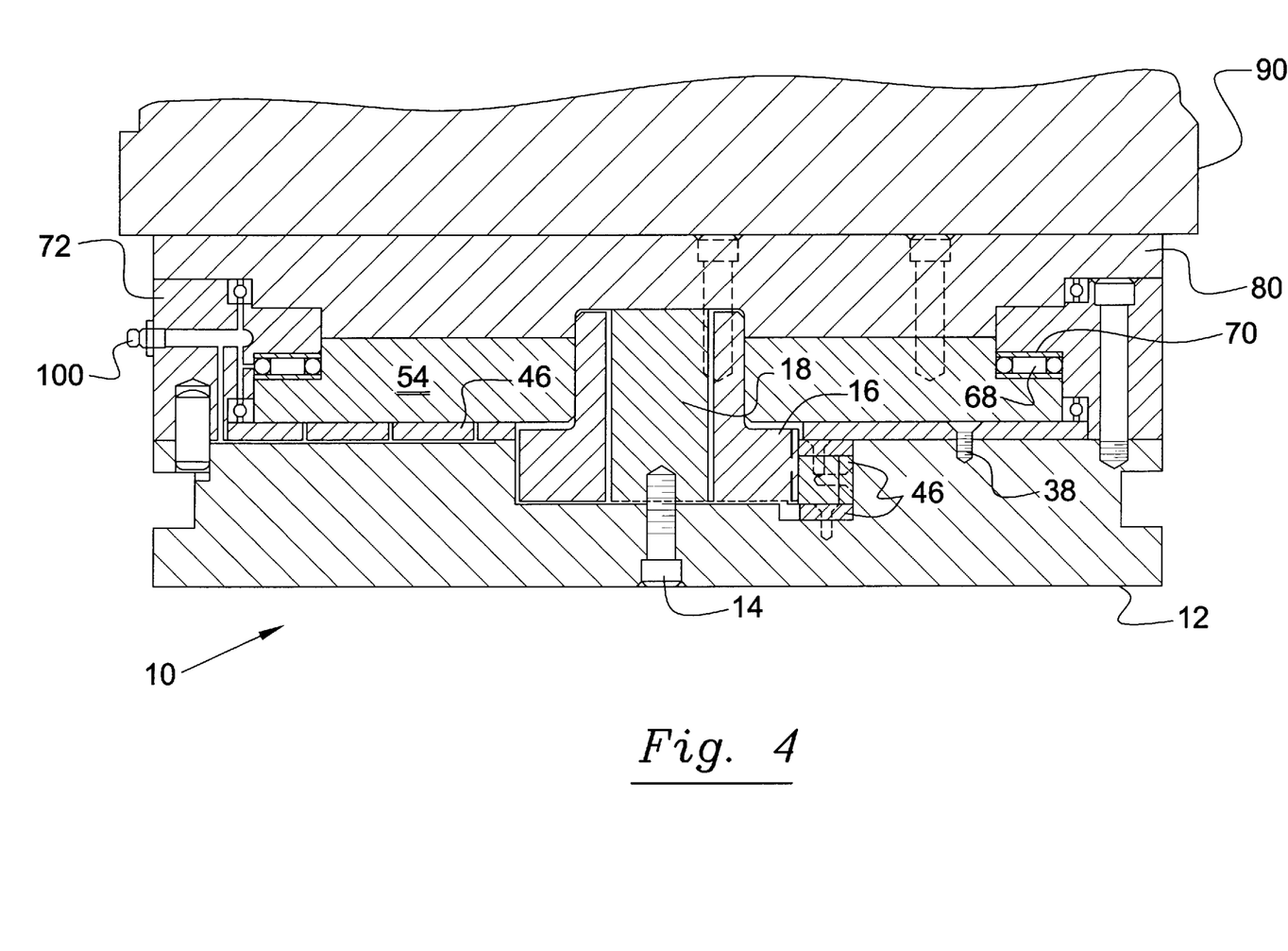
FIG. 4 is an enlarged sectional view in elevation of the rotatable platen.
Figure 5:
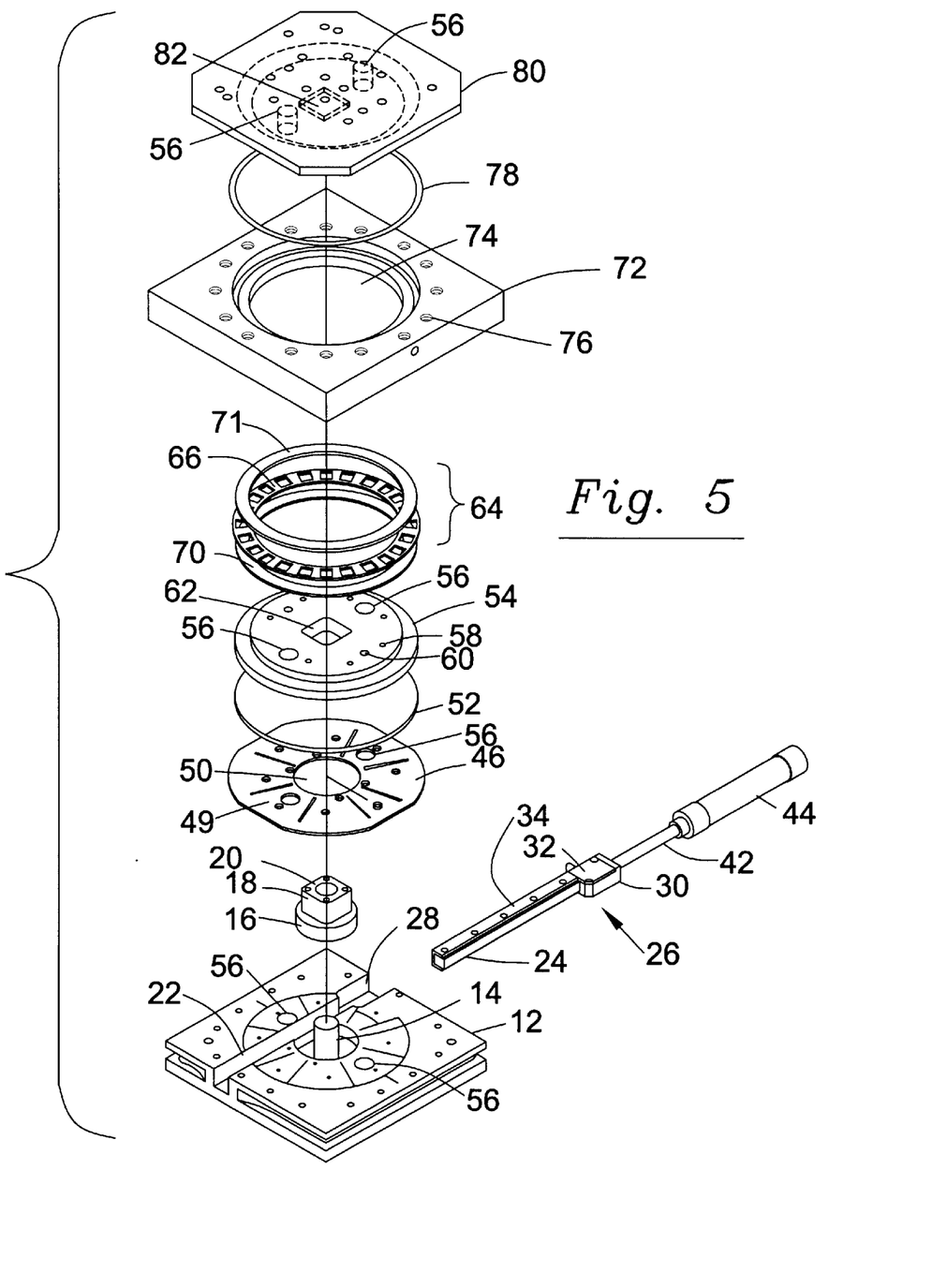
FIG. 5 is an exploded view of the rotatable platen.
Figure 6:
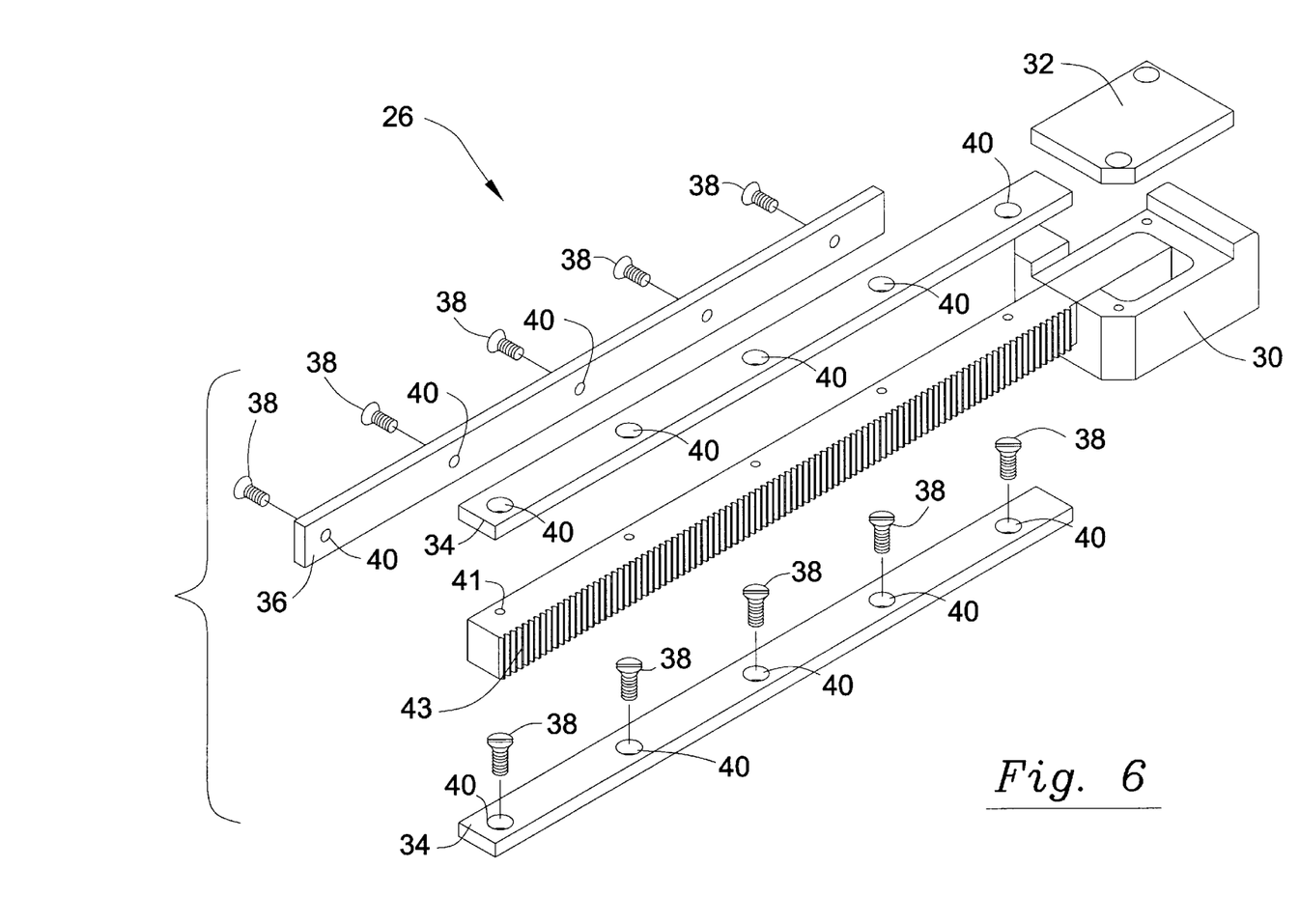
FIG. 6 is a perspective view of the rack assembly and its wear plates.
Figure 7:
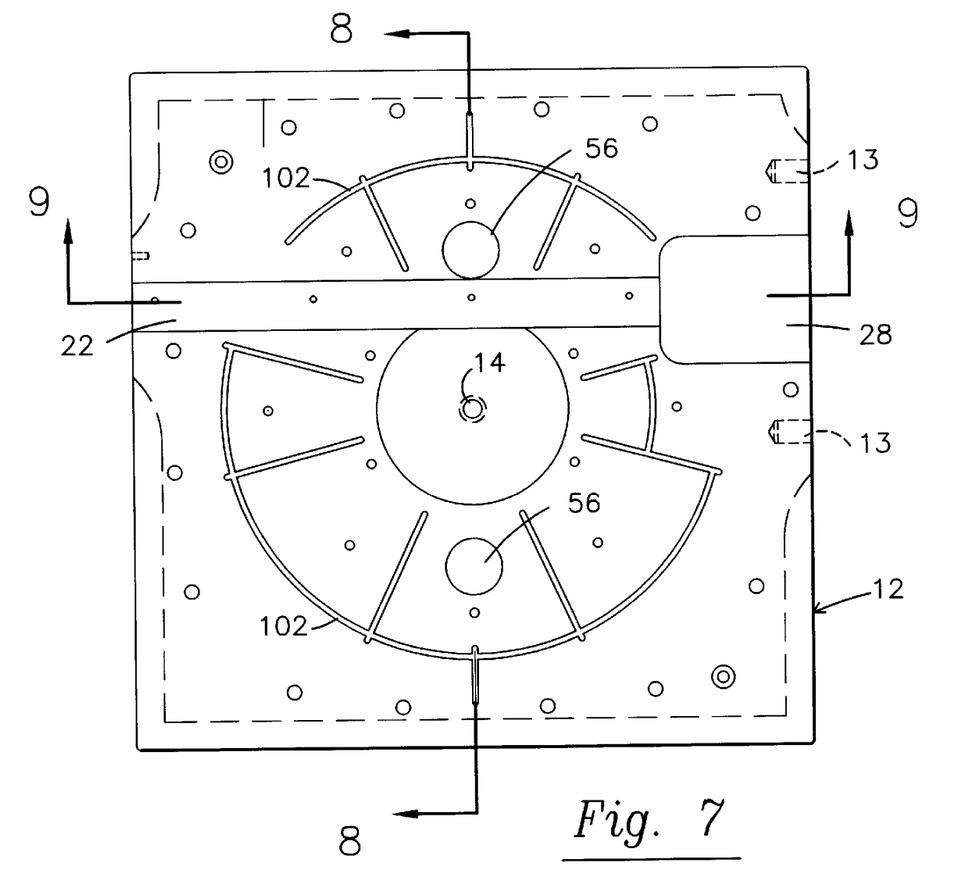
FIG. 7 is a plan view of the bottom clamp plate.
Figure 8:
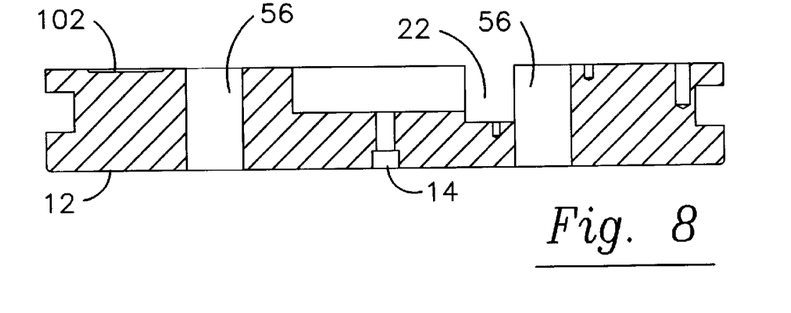
FIG. 8 is a sectional view along line 8—8 in FIG. 7.
Figure 9:
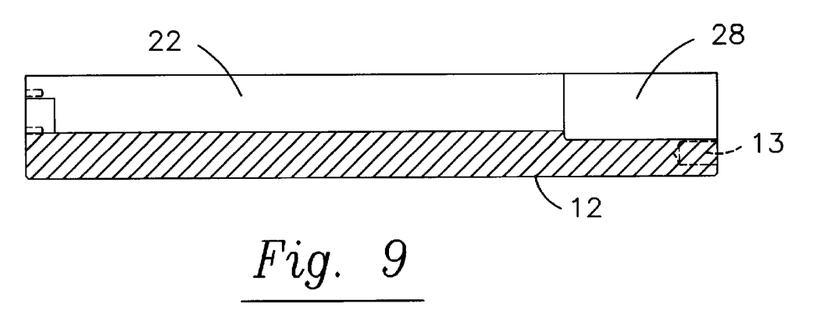
FIG. 9 is a sectional view along line 9—9 in FIG. 7.

Referring to FIGS. 4–5, the rotatable platen 10 of this invention has a bottom clamp plate 12 having a centrally located bolt or support bar pillar 14, that supports an axially rotatable gear 16 which has a square shaft 18 vertically projecting axially from gear 16. The shaft 18 has a bore 20. The bottom clamp 12 has a horizontal slot 22 which receives the front portion 24 of a rack assembly 26. Slot 22 has a wider first opening 28 to accommodate a rack retainer 30 having a cover 32. The rack assembly 26 has a top wear plate 34 and a side wear plate 36 as can be more clearly seen in FIG. 6. Screws 38 hold the wear plates in place in bores 40 connected to corresponding bores 41 in the rack 43. The rack assembly 26 moves into slot 22 propelled by a piston 42 of a hydraulic cylinder 44.

Figure 10:
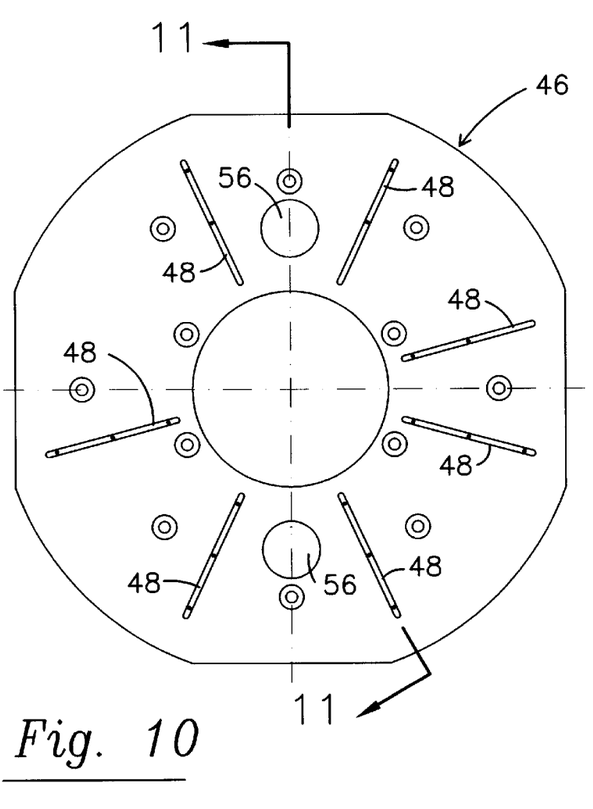
FIG. 10 is a plan view of the wear plate.
Figure 11:
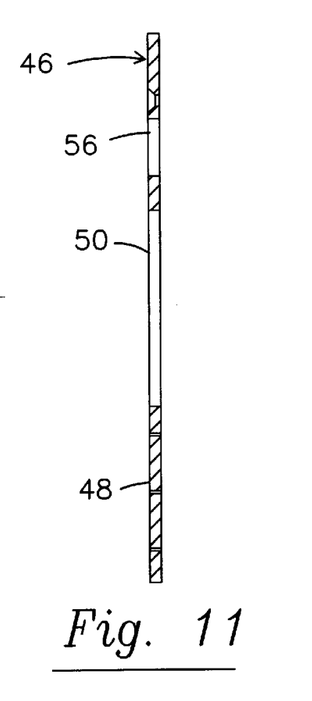
FIG. 11 is a sectional view along line 11—11 in FIG. 10.

A wear plate 46 shown in FIGS. 5, 10 and 11 has grease grooves 48 and is circumferentially located on the bottom clamp plate 12. The gear shaft 18 projects through opening 50 in the wear plate 46. Registration holes 49 are located circumferentially around the wear plate 46 and with knock-out holes 56 are aligned with other elements of the platen 10.

Figure 12:
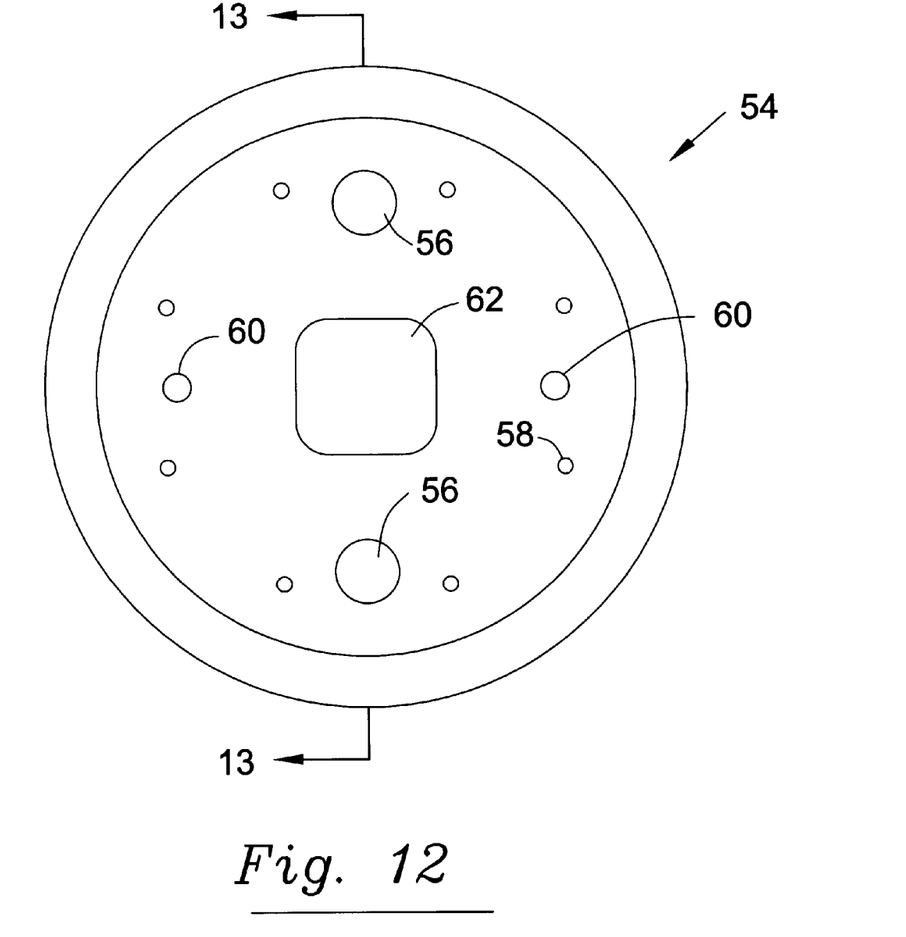
FIG. 12 is a plan view of the lower rotating plate.
Figure 13:
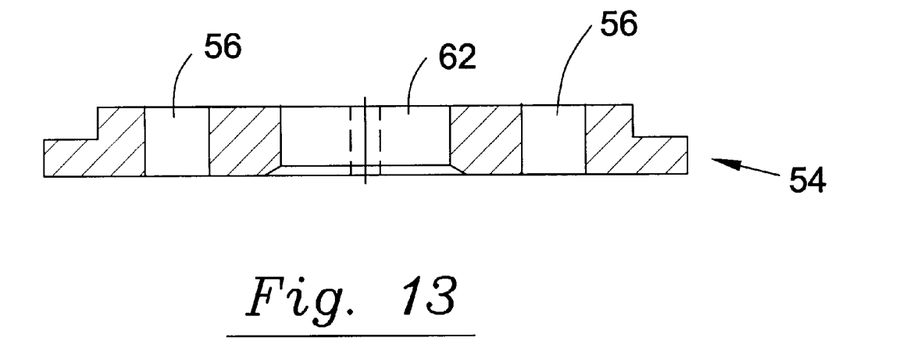
FIG. 13 is a sectional view along 13—13 in FIG. 12.
Figure 14:
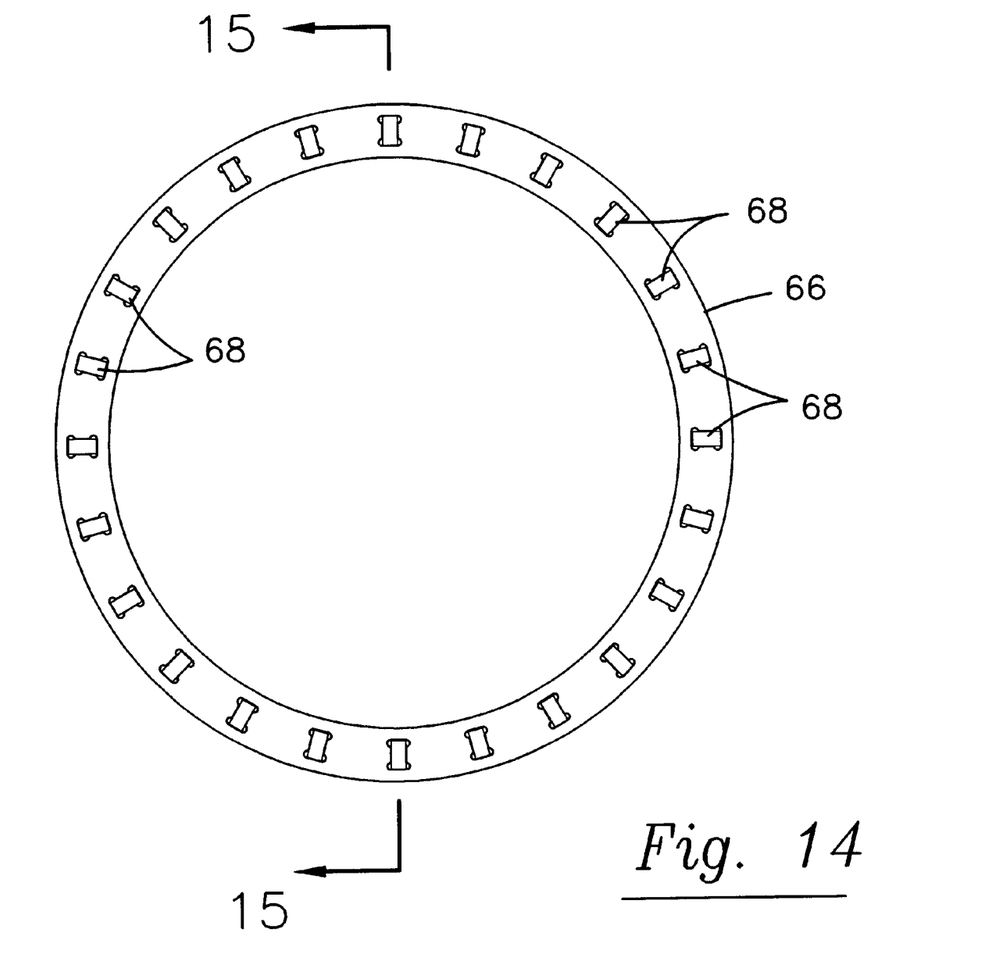
FIG. 14 is a plan view of the bearing retaining ring in the thrust bearing.
Figure 15:
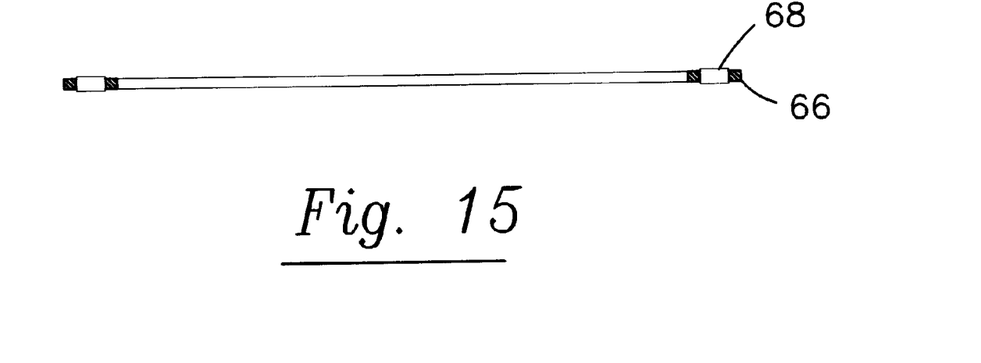
FIG. 15 is a sectional view along 15—15 in FIG. 14.

A bearing 52 supports a lower rotating plate 54 that rides over the wear plate 46. The lower rotating plate 54 has knock-out holes 56 and bolt holes 58 together with registration holes 60 as seen in FIG. 12. A central opening 62 accommodates gear shaft 18. A thrust bearing 64 rests on lower rotating plate 54. As seen in FIGS. 15 and 5, the thrust bearing 64 has a bearing retaining ring 66 with multiple bearings 68 located around the bearing retaining ring 66. The thrust bearing also includes a bottom retaining plate 70 and a top retaining plate 71.

Figure 16:
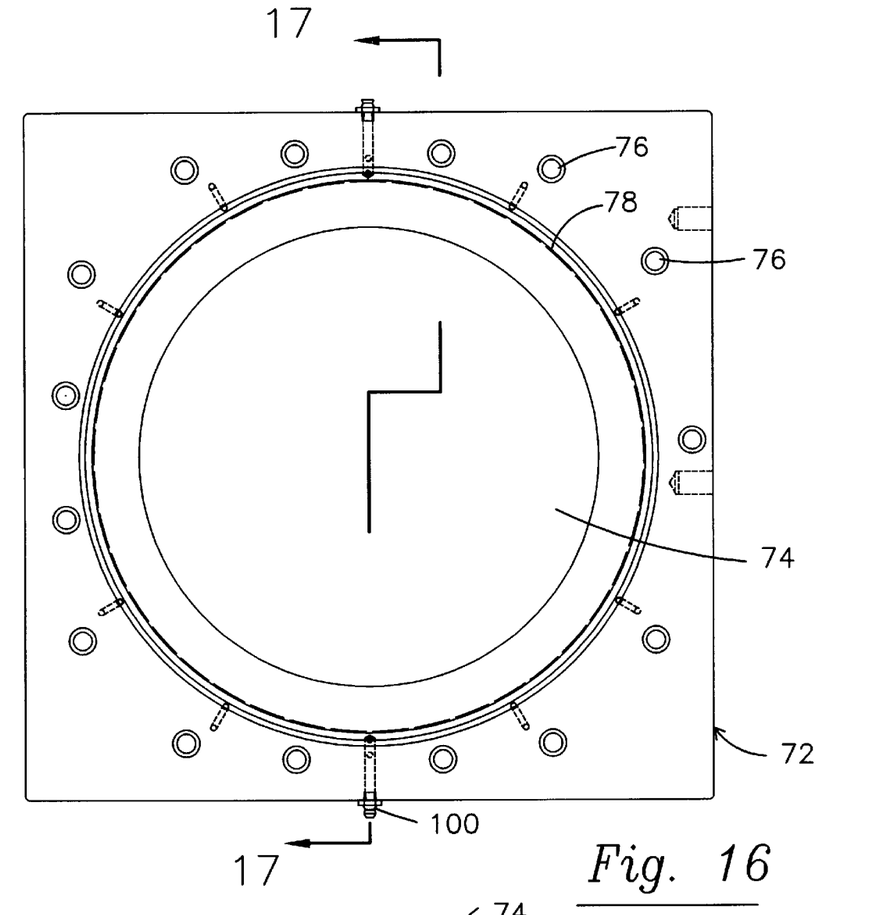
FIG. 16 is a plan view of the intermediate housing.
Figure 17:
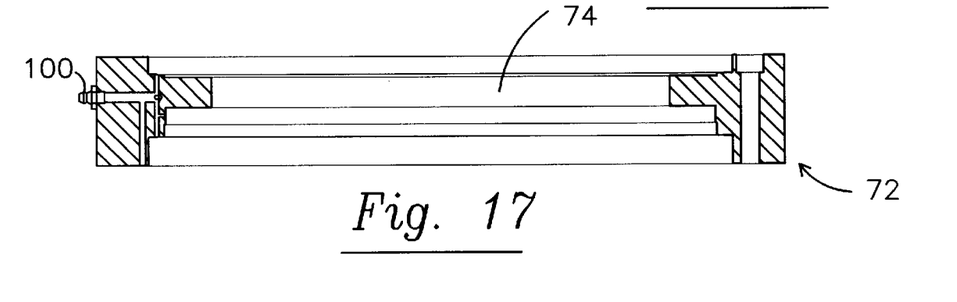
FIG. 17 is a sectional view along 17—17 in FIG. 16.
Figure 18:
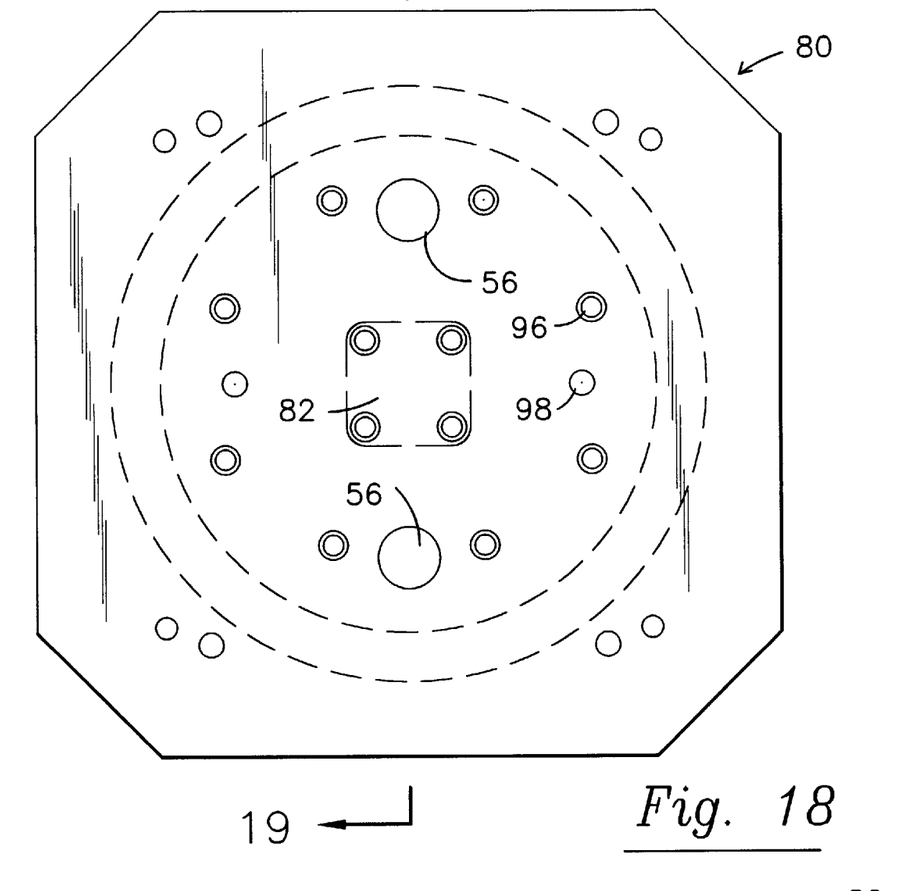
FIG. 18 is a plan view of the upper rotating plate.
Figure 19:
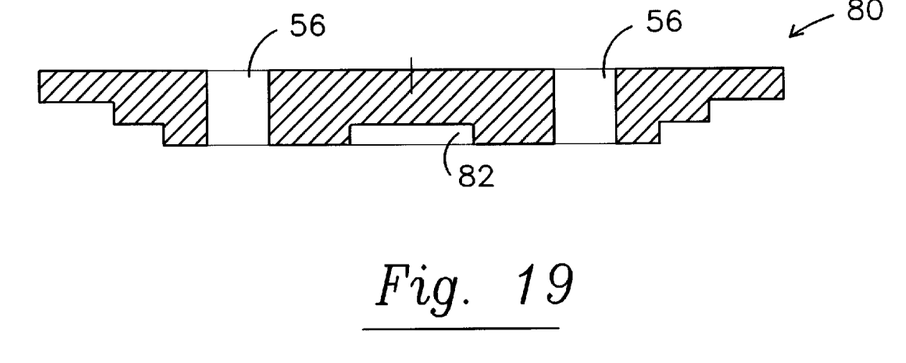
FIG. 19 is a sectional view along 19—19 in FIG. 18.

The thrust bearing 64 is enclosed within an intermediate housing 72 shown in detail in FIGS. 16–17. The intermediate housing 72 has a central opening 74 and multiple bolt holes 76. A bearing 78 sits within opening 74 of the intermediate housing 72.

An upper rotating plate 80 sits on top of the bearing 78 and intermediate housing 72 and has a central opening 82 that accommodates the top portion of the gear shaft 18. Holes 56 are used to accommodate push rods that eject a molded article from a mold 90 which is mounted on upper rotating plate 80. Registration holes 98 and bolt holes 76 align with lower elements of the platen 10. A mold 90 is seen in FIG. 4 bolted to upper rotating plate 80.

The wear plate 46 is made of steel and is bronze laminated. The bearing retaining ring 66 is made of brass and the remainder of the mold rotating apparatus is made of steel.

Figure 3:
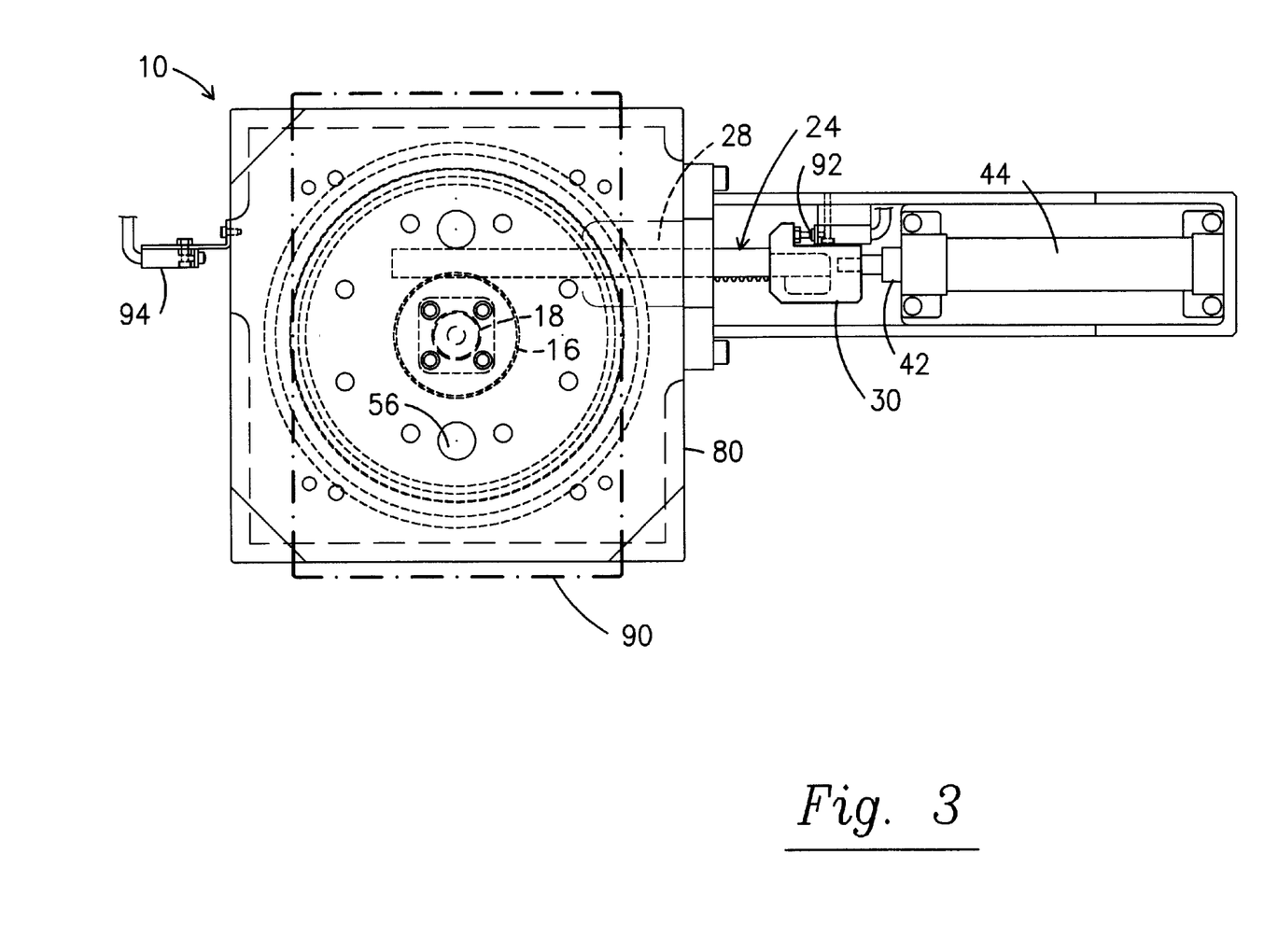
FIG. 3 is a top plan view of the rotatable platen as shown in FIG. 1, but with the rack assembly in the retracted position.

Movement of the rack assembly 26 about six inches inwardly in slot 22 (FIG. 1) will turn the upper rotating plate 180 degrees along with the mold attached to it by bolts. Full retraction of the rack assembly 26 as seen in FIG. 3 returns the upper rotating plate to its original position. Movement of the rack assembly 26 can be controlled by a hydraulic cylinder 44 or by attaching an electric D.C. motor with a shaft that will give motion directly to the center gear 16 to turn the mold 360° and continuously thereafter.

Figure 1:
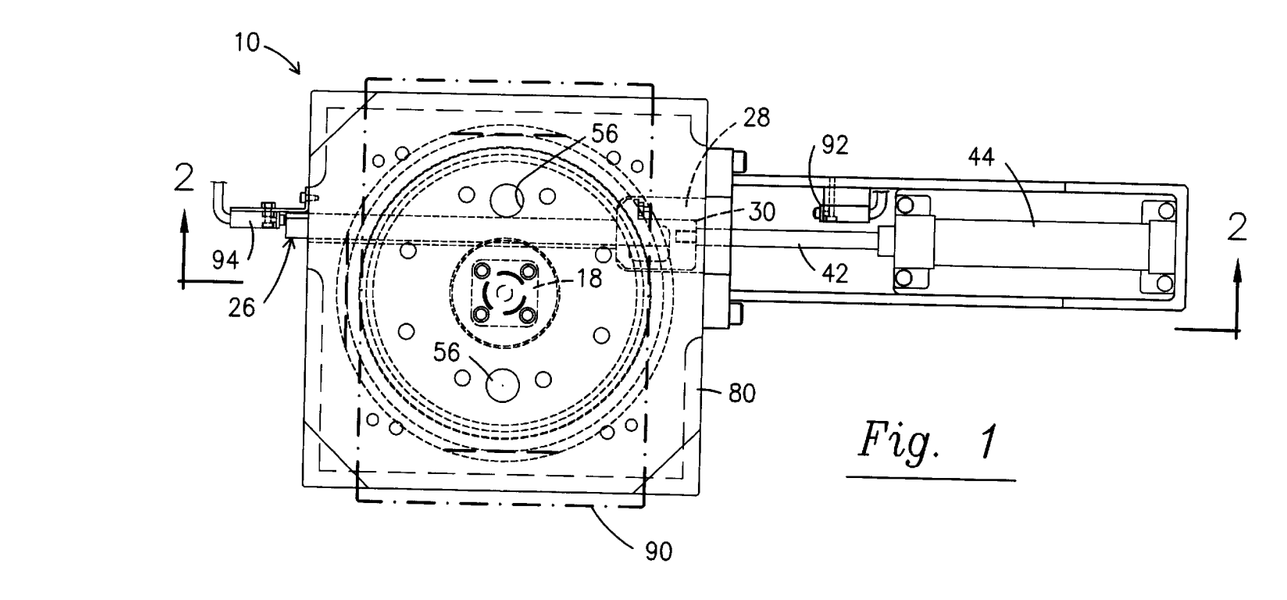
FIG. 1 is a top plan view of the rotatable platen of this invention with the outline of a mold supported by the platen and the rack assembly in the extended position.
Figure 2:
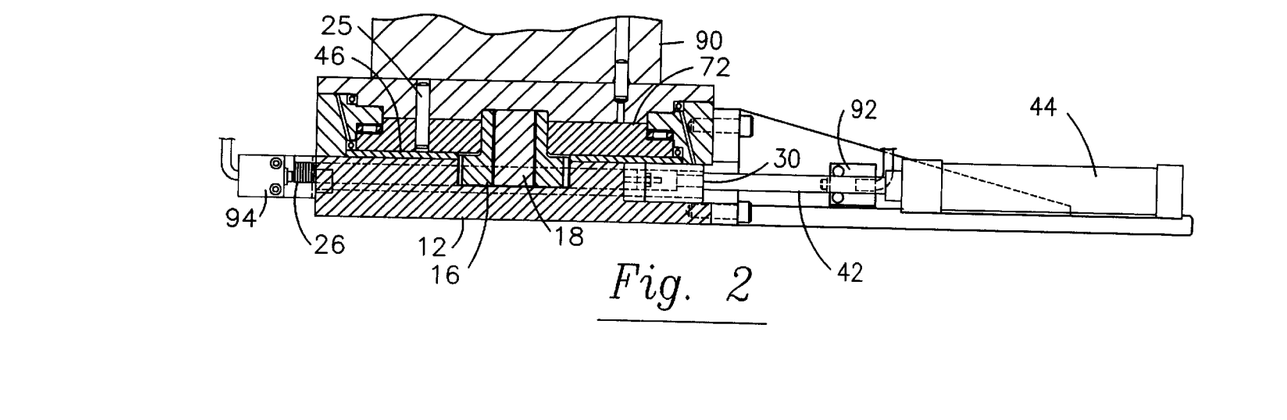
FIG. 2 is an elevational view of the rotatable platen partially in section.

Limit switch 92 and 94 shown in FIGS. 1–3 prevents the rack assembly 26 from over extending or over retracting.

Mold 90 is bolted to the upper rotating plate 80 through bolt holes 96. Registration holes 98 align the upper rotating plate 80 with the remainder of the rotatable support platen 10 elements. Alignment or joiner pins 25 connect the upper rotating plate 80 and intermediate housing 72 as shown in FIG. 2. The rotable support platen permits precise movement of a mold through a 180° arc so as to present the mold openings to different polymer injection nozzles discharging polymers of different colors in order to produce plastic parts having multiple colors.

The thrust bearing 64 handles the greater part of the mold 90 weight and permits the mounting of large heavy molds on the upper rotating plate 80. The design of the wear plate prevents early breakdown of the rotating support platen and provides long time use.

Grease fittings 13 and 100 and grease grooves 102 provide means to keep the rotatable support platen properly lubricated.

Equivalent elements can be substituted for the elements of the mold rotation apparatus to provide substantially the same function with substantially the same way of operation and with substantially the same results.

Having thus described the invention what is claimed and desired to be secured by Letters Patent is:

1. A rotatable platen for supporting a mold employed for making multi-colored plastic objects, the platen comprising
   (a) a bottom clamp plate having a central pillar supporting an axially rotating gear and a longitudinal slot receiving a rack assembly with the rack assembly in engagement with the rotating gear,
   (b) a wear plate having a central bore mounted over the bottom clamp plate,
   (c) a lower rotating plate having a central bore mounted over the wear plate,
   (d) a thrust bearing mounted over the lower rotating plate,
   (e) a housing enclosing a portion of the thrust bearing, and
   (f) an upper rotating plate containing means for mounting a mold for receiving at least two different color polymers for making plastic objects.

2. The rotatable support platen according to claim 1 wherein the rack assembly is driven by a hydraulic piston.

3. The rotatable support platen according to claim 1 wherein the thrust bearing contains an upper and lower circular ring enclosing a circular bearing retaining ring.

4. The rotatable support platen according to claim 2 wherein one full stroke of the hydraulic piston rotates the upper rotating plate 180° from a starting position and a return stroke rotates the upper rotating plate 180° back to the starting position.

5. The rotatable support platen according to claim 1 wherein the wear plate is bronze laminated over steel.

6. A multi-color injection mold rotation apparatus comprising
   (a) a bottom plate having a centrally located pillar supporting an axially rotating gear and a longitudinal slot receiving a rack assembly with gear teeth in the rack assembly engaging the axially rotating gear, the rotating gear driving a vertical shaft turning a lower rotating plate and an upper rotating plate;
   (b) a wear plate intermediate the bottom plate and the lower rotating plate,
   (c) a thrust bearing mounted over the lower rotating plate,
   (d) a housing enclosing a portion of the thrust bearing; and
   (e) the upper rotating plate containing means on an upper surface for mounting a mold for receiving different color polymers for making plastic objects.

7. The mold rotation apparatus according to claim 6, wherein the rack assembly moves forward and back in a longitudinal direction within the slot in the bottom plate and drives the axially rotating gear so that the upper rotating plate moves 180°.

8. The mold rotation apparatus according to claim 7, wherein a limit switch at front and back end of the rack assembly prevents movement of the rotating gear and the upper rotating plate beyond 180°.

9. The mold rotation apparatus according to claim 7, wherein the rack assembly is driven by a hydraulic piston.

10. The mold rotation apparatus according to claim 6, wherein the wear plate is bronze laminated over steel.

11. The mold rotation apparatus according to claim 6, wherein the thrust bearing comprises a top and bottom retaining ring and an intermediate bearing retaining ring containing multiple bearings spaced around a top surface of the bearing retaining ring.

12. The mold rotation apparatus according to claim 6, wherein the rack assembly has a top and side wear plate attached to a rack with gear teeth cooperating with gear teeth in the axially rotating gear.

13. An apparatus for supporting and turning a mold for receipt of a molten plastic suitable after hardening for producing plastic objects, the apparatus comprising
   (a) a bottom claim plate having a central pillar supporting an axially rotating gear driven by a rack assembly movable within a longitudinal slot in the clamp plate, the rotating gear turning a vertical shaft;
   (b) a wear plate mounted over the bottom clamp plate;
   (c) a thrust bearing mounted intermediate an upper and lower rotating plate mounted over the wear plate, the upper and lower rotating plates turning in response to movement of the vertical shaft; and
   (d) the upper rotating plate containing means for mounting a mold for receiving molten polymer for making plastic objects.

14. The apparatus according to claim 13 wherein the rack assembly is driven by a hydraulic piston.

15. The apparatus according to claim 13 wherein a limit switch is located at a front and back end of the rack assembly to prevent movement of the upper rotating plate beyond a prescribed circular distance.

16. The apparatus according to claim 13, wherein the upper rotating plate contains means for supporting the mold in a fixed position with respect to the upper rotating plate.

17. The apparatus according to claim 16, wherein the means for supporting the mold are vertical bores in the upper rotating plates accommodating bolts through the mold to hold the mold in place.

18. The apparatus according to claim 13 wherein the thrust bearing comprises an annular member containing spaced apart bearings on a top surface located between a top and bottom annular retaining plate.

19. The apparatus according to claim 18, wherein the thrust bearing is at least partially enclosed within a housing having a central opening for accommodating the thrust bearing.